US012281005B2

(12) United States Patent
Ben Baruch et al.

(10) Patent No.: US 12,281,005 B2
(45) Date of Patent: Apr. 22, 2025

(54) BEVERAGE DISPENSER WITH DISPENSING BUTTON ACTUATABLE BY PIVOTABLE VESSEL-SHELF

(71) Applicant: STRAUSS WATER LTD, Or Yehuda (IL)

(72) Inventors: Omer Ben Baruch, Kiryat Ono (IL); Eyal Krystal, Kfar-Saba (IL); Dany Ascher, Kibbutz Mishmarot (IL); Orly Nahum, Ramat Gan (IL)

(73) Assignee: STRAUSS WATER LTD., Or Yehuda (IL)

( * ) Notice: Subject to any disclaimer, the term of this patent is extended or adjusted under 35 U.S.C. 154(b) by 110 days.

(21) Appl. No.: 18/003,944

(22) PCT Filed: Jul. 1, 2021

(86) PCT No.: PCT/IL2021/050815

§ 371 (c)(1),
(2) Date: Dec. 30, 2022

(87) PCT Pub. No.: WO2022/003698

PCT Pub. Date: Jan. 6, 2022

(65) Prior Publication Data

US 2023/0278849 A1 Sep. 7, 2023

(30) Foreign Application Priority Data

Jul. 1, 2020 (IL) .......................................... 275787

(51) Int. Cl.

*B67D 1/08* (2006.01)
*B67D 1/12* (2006.01)
*B67D 1/16* (2006.01)

(52) U.S. Cl.

CPC ............ *B67D 1/0894* (2013.01); *B67D 1/12* (2013.01); *B67D 1/16* (2013.01)

(58) Field of Classification Search

CPC ..... F25D 23/02; F25D 23/028; B67D 1/0894; B67D 1/12; B67D 1/16; H01H 5/00
See application file for complete search history.

(56) References Cited

U.S. PATENT DOCUMENTS

| | | | | |
|---|---|---|---|---|
| 7,958,742 B2 * | 6/2011 | Park | ...................... | F25D 23/126 62/389 |
| 9,506,682 B2 * | 11/2016 | Yun | ...................... | F25D 23/028 |
| 2007/0289669 A1 | 12/2007 | An et al. | | |

FOREIGN PATENT DOCUMENTS

| | | |
|---|---|---|
| CN | 102670070 A | 9/2012 |
| CN | 202589282 U | 12/2012 |

(Continued)

OTHER PUBLICATIONS

International Search Report and Written Opinion in International Appln. No. PCT/IL2021/050815, mailed Sep. 8, 2021, 13 pages.

*Primary Examiner* — Frederick C Nicolas
*Assistant Examiner* — Robert K Nichols, II
(74) *Attorney, Agent, or Firm* — Fish & Richardson P.C.

(57) ABSTRACT

The present disclosure concerns a user-operable beverage dispenser having a beverage dispensing mechanism that enables dispensing of beverage by a hands-free or hands-contactless operation. A vessel-supporting shelf is pivotably articulated to the housing and is displaceable about a pivot axis between an open state in which the shelf is parallel to a base of the housing and configured to support a removable vessel thereon below a dispensing outlet, and a closed state in which the shelf is substantially parallel to a sidewall portion of the housing, a beverage dispensing actuation element located on a sidewall portion of the housing; and when in the closed state of the shelf, a section of the shelf is aligned and in contact with the beverage dispensing (Continued)

actuation element, and when in the open state of the shelf, the beverage dispensing actuation element is user-accessible by the vessel directly.

14 Claims, 4 Drawing Sheets

(56) References Cited

FOREIGN PATENT DOCUMENTS

| | | | |
|---|---|---|---|
| CN | 108289567 | A | 7/2018 |
| EP | 1925895 | A2 | 5/2008 |
| KR | 20100124564 | A | 11/2010 |
| KR | 20200070202 | A | 6/2020 |

* cited by examiner

BEVERAGE DISPENSER WITH DISPENSING BUTTON ACTUATABLE BY PIVOTABLE VESSEL-SHELF

CROSS-REFERENCE TO RELATED APPLICATIONS

This application is a National Stage Application under 35 U.S.C. § 371 and claims the benefit of International Application No. PCT/IL2021/050815, filed Jul. 1, 2021, which claims priority to Israel Patent Application No. 275787, filed Jul. 1, 2020. The disclosure of the foregoing application is hereby incorporated by reference in its entirety.

TECHNOLOGICAL FIELD

The present disclosure concerns a user-operable beverage dispenser having a beverage dispensing mechanism.

BACKGROUND

Beverage dispensers, particularly those intended and designed for home use, typically comprise dispensing actuation buttons. Such buttons are usually located at a top, user-accessible portion of the dispenser, and require a user to press on the button in order to dispense the beverage.

GENERAL DESCRIPTION

The present disclosure provides a beverage dispenser having a dispensing mechanism that permits the user to dispense beverage in a controlled manner by a hands-free (hand-contactless) mechanism.

In one of its aspects, the present disclosure provides a beverage dispenser comprising a housing, a beverage dispensing outlet, a container-supporting shelf pivotably articulated to the housing, and one or more first beverage dispensing actuation elements located on an external sidewall portion of the housing. The container-supporting shelf is pivotably displaceable about a pivot axis between an open state in which the shelf is substantially parallel to a base of the housing and configured to support a removable container below the dispensing outlet, and a closed state in which the shelf is substantially parallel to an external sidewall portion of the housing. When in the closed state of the shelf, a section of the shelf is aligned and in contact with the first beverage dispensing actuation elements, such that application of pressure onto said section of the shelf when in the closed state causes actuation of the first beverage dispensing elements, and when in the open state of the shelf, the first beverage dispensing actuation elements are user-accessible.

In other words, when in the open state, the first beverage dispensing actuation elements may be accessed by the user in order to dispense the beverage into the container supported by the shelf. When in the closed state, the first beverage dispensing actuation elements are not accessible to the user, however due to several closed positions of the shelf (to be described below), application of pressure onto the shelf causes a section thereof to press onto the first beverage dispensing actuation elements, thus permitting dispensing of beverage into a container of possible larger size positioned below the dispensing outlet without the need to allow direct user-access to the first beverage dispensing actuation elements.

By such a mechanism, when the shelf is at its closed state, a user can place a container below the dispenser, and by applying force onto the container against the shelf, pressure is transferred to the first beverage dispensing actuation elements causing beverage to be dispensed into the container as long as pressure onto the shelf is maintained by the container.

In the text herein, an element-relating frame of reference will be used to indicate relative vertical positioning; accordingly, a vertical direction that extends between a base of the dispenser and the dispensing outlet will be used. The terms "below" and "above" will be used with reference to this vertical direction. Similarly, a horizontal frame of reference will be used to indicate horizontal positioning of various elements, such that the "outward" direction means to denote an element horizontally extending away (protruding outwardly from) an external wall or face of the housing.

The term "substantially parallel" means to denote an element which is parallel to another element, within the context of this disclosure, defining an angle therebetween (or between the respective planes defined by the elements) of no more than about 5°.

In some embodiments, when in the open position, the shelf is substantially perpendicular to the external sidewall portion. The term "substantially perpendicular" means to denote an element which is angled to another element (in this case the shelf and the external sidewall portion), defining therebetween an angle in the range of about 65°-90°.

In order to prevent undesired dispensing of beverage when the shelf is at its closed state, the closed state permits the shelf to have at least two functional positions: a first closed position in which the section of the shelf is aligned and in contact with said first beverage dispensing actuation elements without applying pressure onto the first beverage dispensing elements, and a second closed position in which the section of the shelf applies pressure onto the first beverage dispensing elements. The container-supporting shelf is biased to the first closed position, such that when no pressure is applied, the shelf can be maintained at a closed state however without dispensing beverage.

The second closed position is typically rotationally displaced about said axis from the first closed position, such that displacing the shelf from the first position into the second position (and vice versa) causes its angular displacement between two angular positions. The angle between the first and second closed positions is typically less than 20°, for example between about 2° and 10°.

Biasing of the shelf into the first closed position can be obtained by various biasing arrangements.

By an embodiment, the first beverage dispensing actuation elements have a pressed position (corresponding to the second closed position of the shelf) and a non-pressed position (corresponding to the first closed position of the shelf), and are biased to the non-pressed position by a biasing element. The biasing element may be any element know per se, e.g. a spring. Thus, when the shelf is in its second closed position, the transition of the first beverage dispensing actuation elements from the pressed position into the non-pressed position due to the bias of the biasing element also biases the shelf into the first closed position.

By another embodiment, the shelf comprises a biasing resilient member for biasing the shelf into the first closed position when in the closed state; thus, the shelf can be maintained at a closed state when pressure is no longer applied onto it. The resilient member may be an integral part of the shelf, e.g. in the form of a resilient portion of the shelf or in the form of a resilient insert that is fitted into an opening formed in the shelf.

By yet another embodiment, the shelf comprises one or more second beverage dispensing actuation elements configured in the shelf; such that when in the closed state of the shelf, the second beverage dispensing actuation elements are aligned and in contact with said first beverage dispensing actuation elements. Thus, application of force onto the second beverage dispensing actuation elements causes actuation of the first beverage dispensing actuation elements for dispensing the beverage. The second beverage dispensing actuation elements may be rigid or resilient.

By a further embodiment, the shelf comprises a spring-biased member formed within the shelf for biasing the shelf into the first closed position when in the closed state.

Typically, the one or more first beverage dispensing actuation elements are pressure sensitive. In other embodiments, the first beverage dispensing actuation elements may be mechanical push-buttons, levers, switches, etc.

In some embodiments, the external sidewall portion with which the shelf comes into contact when in the closed state can be constituted by a recess that is formed in an external face of the housing, such that the shelf may be at least partially (at times entirely) received within said recess when in the closed state. When the shelf is fully received within the recess, an outward-facing face of the shelf is flush with the external face of the housing. In addition to maintaining a pleasing, streamlined appearance of the dispenser, when the shelf is at its close state, a space is formed below the dispensing outlet (which typically protrudes outwards beyond the external face of the housing). This space may be configured to accommodate a container, such that when the container is received within the space and comes into contact with and pressed against the shelf, the shelf is pressed into said second closed position to permit dispensing of beverage into the container.

This, as noted, enables a user to fill a container with beverage when the first beverage dispensing actuation elements are not accessible. Further, as the space formed below the dispensing outlet is larger when the shelf is in its closed state, larger containers can be placed below the dispensing outlet and filled with beverage. In addition, such a mechanism enables a user to fill various containers with beverage without the need to physically touch the first beverage dispensing actuation elements—minimizing and/or preventing fingers/hand contact with the actuation elements, thus reducing risk of contamination from contact with the actuation elements (which are typically a source of contamination due to multiple-users prolonged contact during dispensing).

The container-support shelf may also be configured to hold beverage spillage or drips from the dispensing outlet, i.e. used as a drip-collection tray.

The dispenser may be suitable for dispensing any beverage, hot or cold, flavored or unflavored. Typically, the dispenser is a water dispenser (for dispensing still water, sparkling water, flavored water, hot water, cold water, etc.).

According to some embodiments, the dispenser comprises one or more water treatment modules, such as water filters, water purifiers, UV lamps, additives-releasing modules/substances, nutraceuticals-releasing modules/substances, or combinations thereof, for treating source water into treated water to be dispensed.

As used herein, the term about is meant to encompass deviation of ±10% from the specifically mentioned value of a parameter, such as temperature, pressure, concentration, etc.

Whenever a numerical range is indicated herein, it is meant to include any cited numeral (fractional or integral) within the indicated range. The phrases ranging/ranges between (or is in a range of between) a first indicate number and a second indicate number and "ranging/ranges from" a first indicate number "to" a second indicate number are used herein interchangeably and are meant to include the first and second indicated numbers and all the fractional and integral numerals therebetween

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
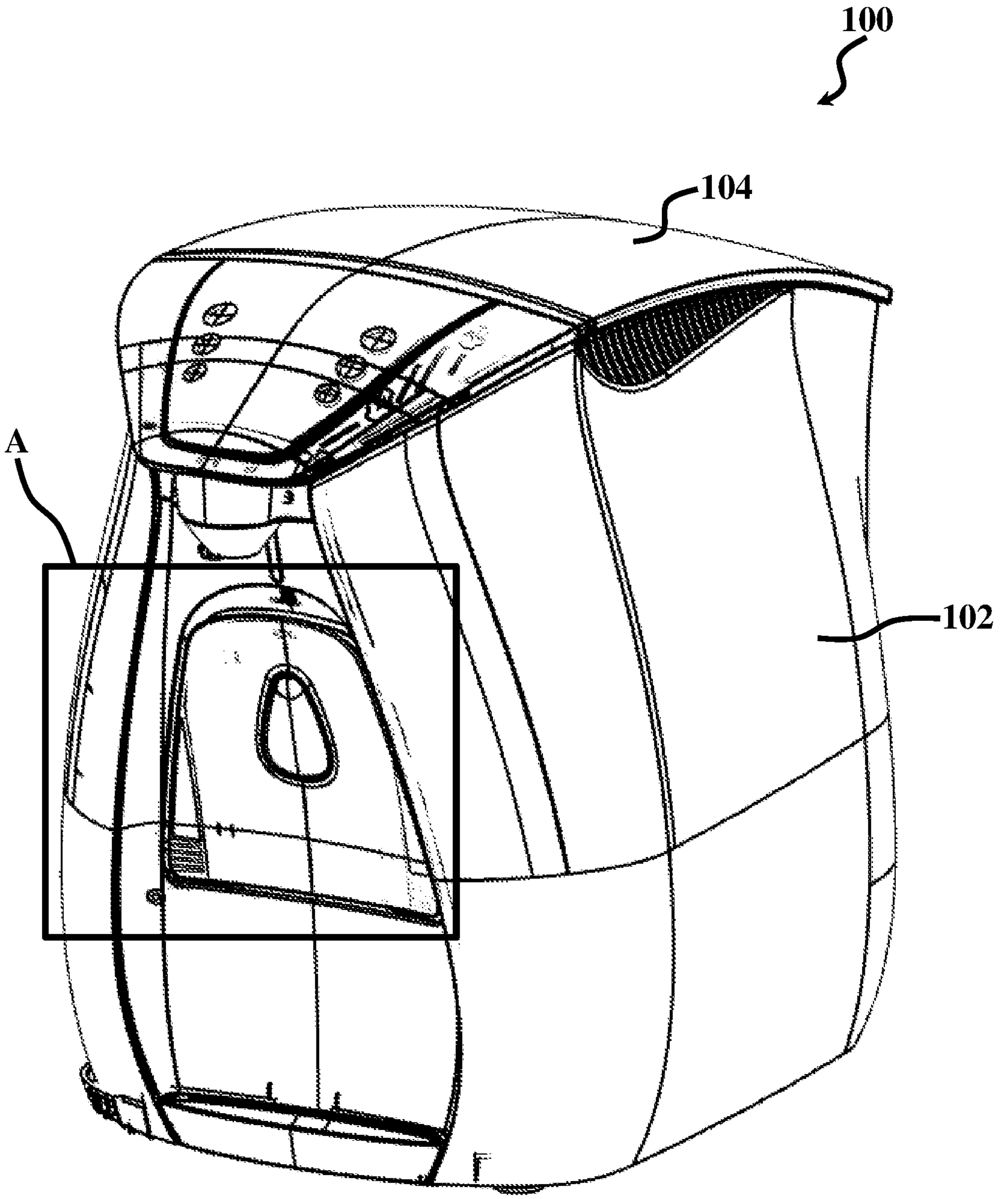
FIG. 1A is a perspective view of a beverage dispenser according to an embodiment of this disclosure, with the container-support shelf at its closed state.
Figure 1B:
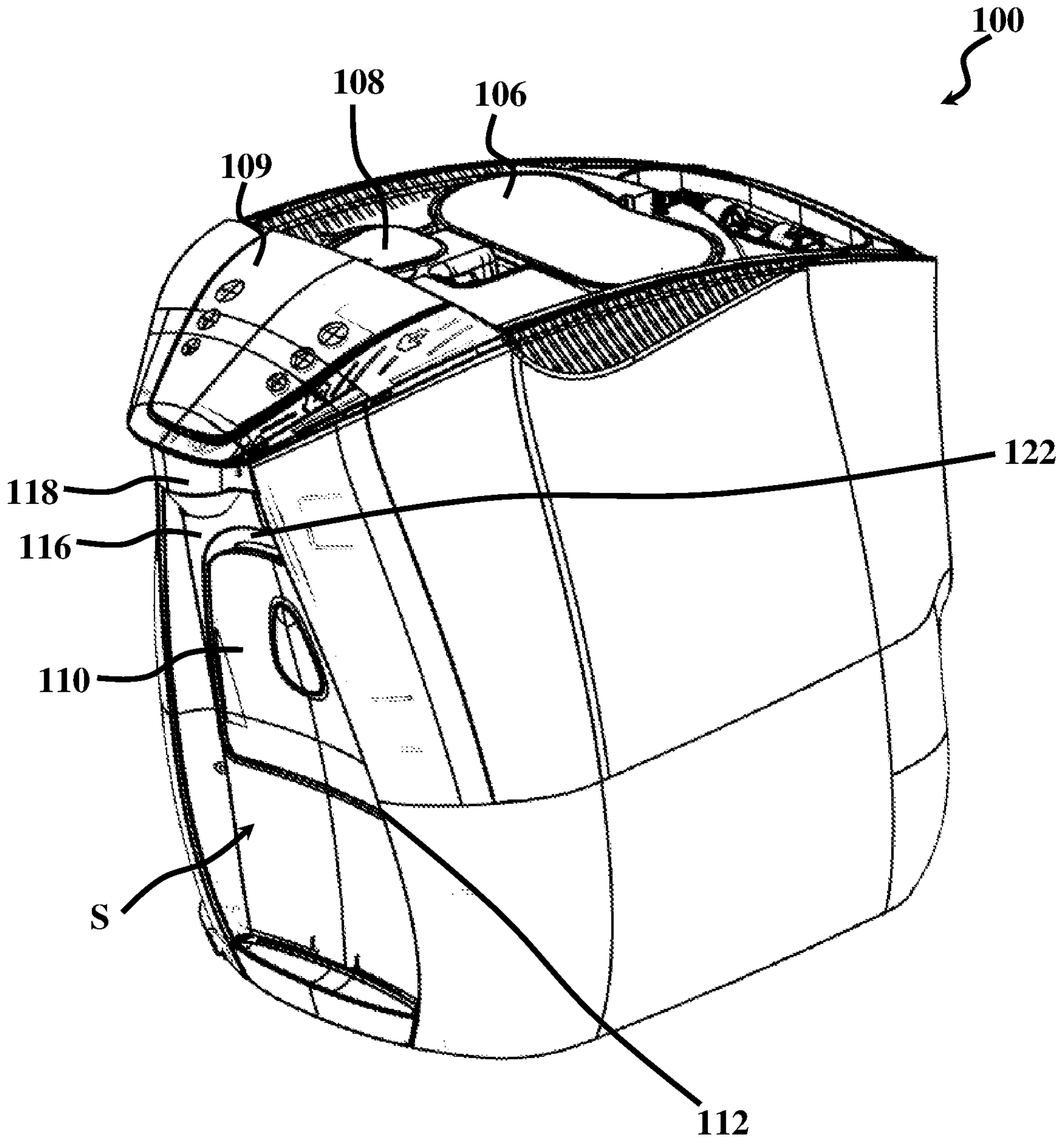
FIG. 1B is a perspective view of a beverage dispenser of FIG. 1A, however with its top cover removed in order to show some internal elements.
Figure 2:
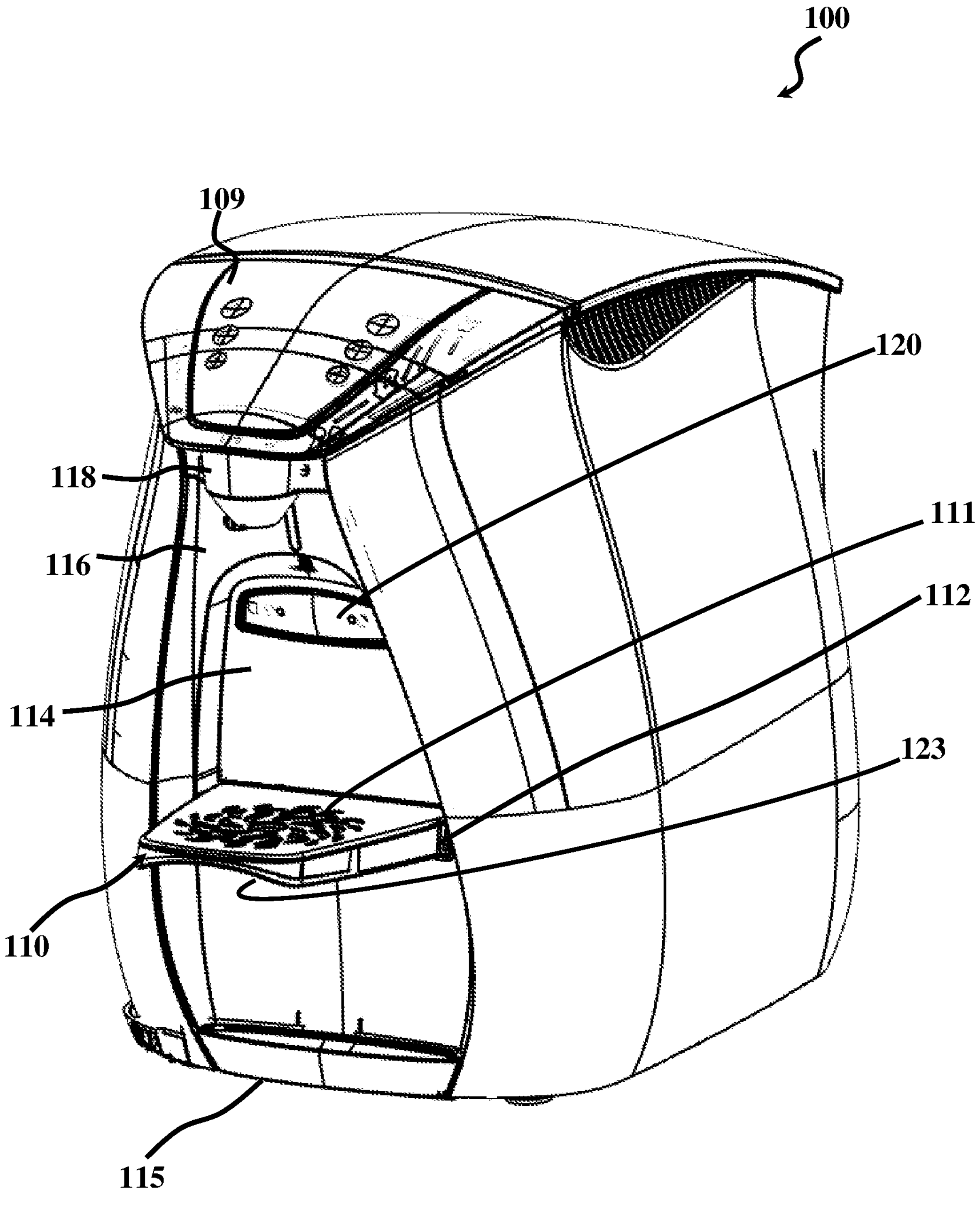
FIG. 2 is a perspective view of a beverage dispenser of FIG. 1A, with the container-support shelf at its open state.

Turning first to FIGS. 1A-2, shown in an exemplary beverage dispenser 100 according to an embodiment of this disclosure. The dispenser is typically a water dispenser, and can be fed water from a main water line; alternatively, the dispenser can be supplied with water from a reservoir. The dispenser 100 comprises a housing 102 with a removable top cover 104. As seen in FIG. 1B, removing the top cover 104 permits a user to access various water treatment modules, such as filtering cartridge 106 and UV lamp 108, that need to be replaced from time to time. The dispenser can further comprise a user-interface panel 109 for controlling various functions of the dispenser, e.g. selecting the type of beverage, the temperature of the beverage, etc. The panel 109 can also comprise beverage dispensing buttons that can be manually pressed in order to dispense beverage from the dispenser, in addition to the contact-less dispensing mechanism described below.

The dispenser comprises a container-support shelf 110 that is pivotably articulated to the housing above pivot axis 112. When in its open state, shown in FIG. 2, the shelf 110 is typically substantially perpendicular to an external sidewall portion of the dispenser, constituted by recess 114 formed in the external face 116 of the housing, and/or substantially parallel to a base 115 of the housing. In the open state, the shelf 110 is positioned vertically below a beverage dispensing outlet 118 of the dispenser (that outwardly protrudes from the housing), such that a container that is placed onto the shelf (e.g. a glass or a cup, not shown) is supported by the shelf below the dispensing outlet, permitting filling of relatively small containers by the beverage with minimum spraying or spillage. The shelf 110 comprises a grid element 111, such that spillage or residual drops dripping from the dispensing outlet 118 can be collected in the shelf and disposed-of when needed.

First beverage dispensing actuation elements 120 are located on the external sidewall portion of the housing, and are user-accessible when the container support shelf 110 is in its open state. Hence, a user can fill the container supported by the shelf by either pressing onto the control panel 109 or onto the actuation elements 120. However, this configuration also permits the user to fill the container in a hand-contactless mode, as will now be explained.

The actuation elements 120 have a pressed position (permitting dispensing of beverage) and a non-pressed position (in which no beverage is dispensed). The actuation elements 120 are biased into the non-pressed position, e.g. by spring 121 (better seen in FIGS. 3A-3B). Hence, when no pressure is applied onto the actuation elements 120, no beverage is dispensed.

By pressing the container directly against actuation elements 120, the dispenser can be actuated to dispense beverage into the container as long as pressure by the container is maintained against the actuation elements 120. Thus, the user does not need to directly touch any actuation elements or dispensing buttons in order to dispense the beverage.

In its closed state, shown in FIGS. 1A-1B (as well as 3A-3B), the shelf 110 is received within recess 114 and is substantially parallel to the external sidewall portion. The recess 114 is slightly larger than the shelf, leaving a gap 122 that can accommodate at least a finger of a user in order to pull the shelf and displace it from the closed state to the open state. As can be seen, when in the first closed position of the closed state (to be described further below) seen in FIGS. 1A-1B, the outward-facing face of the shelf 123 is flush with an external face of the housing, thus forming an aesthetically pleasing contour of the housing. Switching the shelf 110 into its closed state increases the space S below the dispensing outlet 118, permitting accommodation of large containers, such as jugs, bottles, pots, etc., enabling filling large containers with beverage either by operating the buttons on the control panel 109, or in a hands-contactless mode to be described below.

Figure 3B:
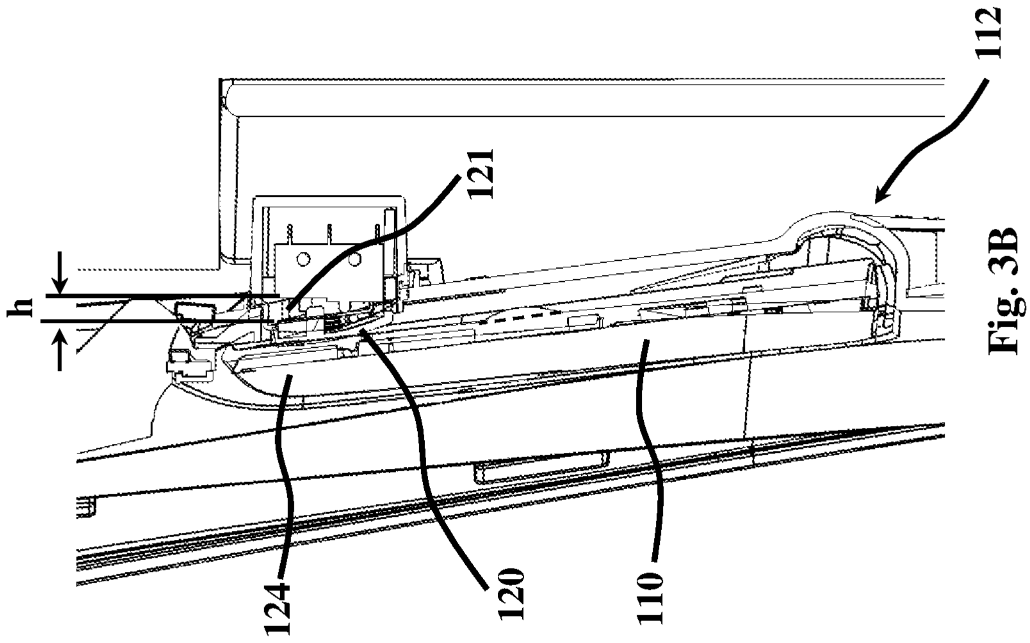
FIG. 3B is a longitudinal cross-section through portion A in FIG. 1A, with the container-support shelf being in the closed state and the second closed position.
Figure 3A:
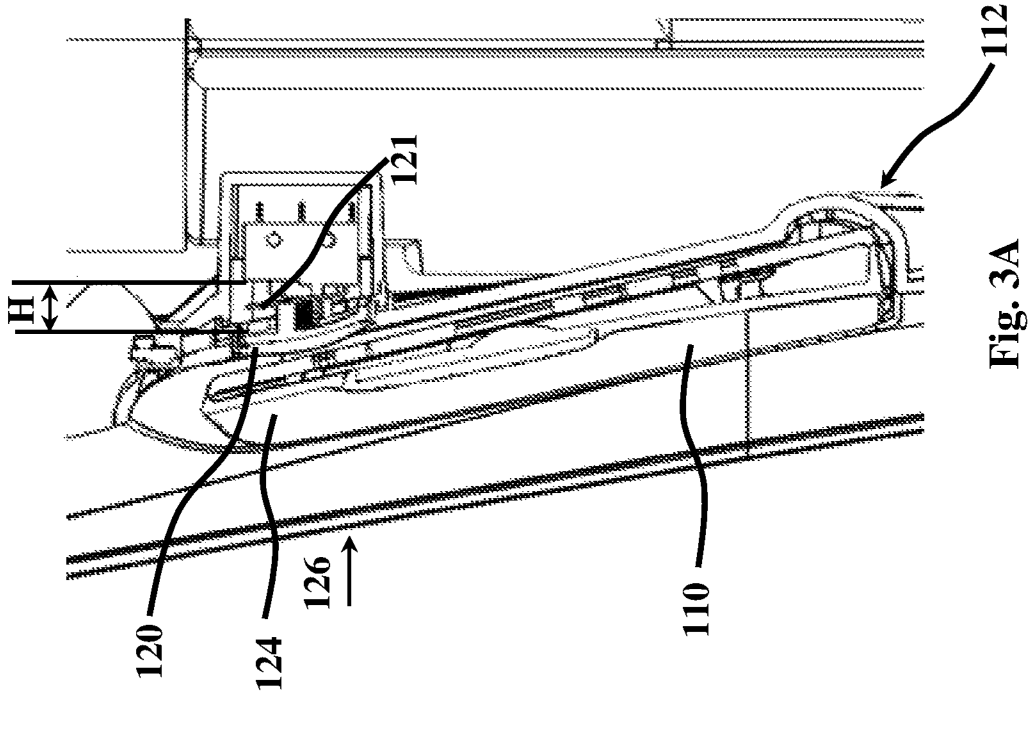
FIG. 3A is a longitudinal cross-section through portion A in FIG. 1A, with the container-support shelf being in the closed state and the first closed position.

As better seen in FIGS. 3A and 3B, the shelf 110 has a section 124 that, when in the closed state of the shelf, is aligned and in contact with actuation elements 120. When in the closed state, the shelf 110 is pivotably displaceable about axis 112 between two functional angular positions—a first closed position in which section 124 of the shelf contacts the actuation element without applying pressure thereon (FIG. 3A), and a second closed position (FIG. 3B) in which application of force in the direction of arrow 126 causes the shelf 110 to angularly displace inward, such that section 124 applies pressure onto the actuation elements 120, thus inducing dispensing of beverage as long as the shelf 110 is maintained in its second closed position by applying force thereonto.

The user can apply force onto the shelf 110 by its hand, or by a container placed in space S—thus operating in hands-contactless mode.

The shelf 110 is biased into the first closed position such that dispensing of beverage is stopped once application of force onto the shelf is stopped. In the exemplified embodiment, biasing of the shelf into its first closed position is enabled by spring 121 of the actuation elements 120. In other words, once no more pressure is applied onto the shelf, no pressure is applied onto the actuation elements 120 against the bias of spring 121, causing the actuation elements 120 to returned into their non-pressed position. As the portion 124 of the shelf is in contact with the actuation elements when in its closed positions, the bias of the spring 121 causes the actuation elements 120 to displace into their non-pressed position, thereby displacing the shelf into the first closed position.

Thus, the extent of displacement between the first and second closed positions is determined by the compression of spring 121. In the non-pressed position of actuation elements 120, spring 121 has a non-compressed height H. When force is applied onto the shelf in the direction of arrow 126, the actuation element is pressed into its pressed position against the bias of spring 121, thus compressing the spring to a smaller height h (h<H), and is held in its compressed state as long as force is applied. Due to its resiliency, once force is no longer applied onto the shelf (and hence no pressure is applied onto the actuation elements 120), the spring 121 returns to its original height H, hence pushing actuation elements 120 into their non-pressed position, and by consequence displacing the shelf 110 back into its first closed position. Thus, the angular difference between the first and second closed positions of the shelf (e.g. in the range of 2° to 10°) is determined and can be controlled by the difference in heights (H minus h) of spring 121.

It is however contemplated that other biasing arrangements may be possible. In another example, the shelf is biased into the first closed position by a resilient biasing member (not shown). In such an arrangement, the resilient biasing member may have, for example, a resilient bulging portion (not shown) that comes into contact with the external sidewall portion of the housing when the shelf is at its closed state, and has a width T. Similarly to the embodiment of FIGS. 3A-3B, when force is applied onto the shelf in the direction of arrow 126, the bulge can deform slightly to have a smaller width t (t<T), and is held in its deformed state as long as force is applied. Due to its resiliency, once force is no longer applied onto the shelf, the bulge can return to its original width T, hence pushing the shelf 110 against the sidewall portion 114 into its first closed position. Thus, the angular difference between the first and second closed positions of the shelf (e.g. in the range of 2° to 10°) can be controlled by the extent of allowable deformation of the bulge.

Although biasing in exemplified by use of a resilient biasing member 128, it is contemplated that the biasing of the shelf can be provided by any other suitable biasing mechanism.

The invention claimed is:

1. A beverage dispenser comprising:

a housing;

a beverage dispensing outlet;

a container-supporting shelf, pivotably articulated to the housing and displaceable about a pivot axis between an open state in which the container-supporting shelf is substantially parallel to a base of the housing and configured to support a removable container thereon below the dispensing outlet, and a closed state in which the container-supporting shelf is substantially parallel to an external sidewall portion of the housing, one or more first beverage dispensing actuation elements, located on said external sidewall portion of the housing; and when in the closed state of the container-supporting shelf, a section of the container-supporting shelf is aligned and in contact with said one or more first beverage dispensing actuation elements, such that application of pressure onto said section of the container-supporting shelf when in the closed state causes actuation of the one or more first beverage dispensing actuation elements, and when in the open state of the container-supporting shelf, the one or more first beverage dispensing actuation elements are user-accessible, wherein said closed state comprises a first closed position in which the section of the container-supporting shelf is aligned and in contact with said one or more first beverage dispensing actuation elements without applying pressure onto the one or more first beverage dispensing actuation elements, and a second closed position in which the section of the container-supporting shelf applies pressure onto the one or more first beverage dispensing actuation elements, the container-supporting shelf being biased to said first closed position, said one or more first beverage dispensing actuation elements have a pressed position and a non-pressed position, and biased to the non-pressed position by a biasing element, and when in the second closed position, the transition of the one or more first beverage dispensing actuation elements from the pressed position into the non-pressed position biases the container-supporting shelf into the first closed position.

2. The dispenser of claim 1, wherein said sidewall portion being in the form of a recess formed in an external face of the housing, the container-supporting shelf being at least partially received within said recess when in the closed state.

3. The dispenser of claim 1, wherein, when in the first closed position, an outward-facing face of the container-supporting shelf is flush with an external face of the housing.

4. The dispenser of claim 1, wherein said container-supporting shelf comprises a biasing resilient member for biasing the container-supporting shelf into said first closed position when in the closed state.

5. The dispenser of claim 4, wherein said biasing resilient member is an integral part of the container-supporting shelf.

6. The dispenser of claim 1, wherein said container-supporting shelf comprises one or more second beverage dispensing actuation elements configured in the container-supporting shelf; such that when in the closed state of the container-supporting shelf, said one or more second beverage dispensing actuation elements are aligned and in contact with said one or more first beverage dispensing actuation elements.

7. The dispenser of claim 1, wherein said container-supporting shelf comprises a spring-biased member formed within the container-supporting shelf for biasing the container-supporting shelf into said first closed position when in the closed state.

8. The dispenser of claim 1, wherein said one or more first beverage dispensing actuation elements are pressure sensitive.

9. The dispenser of claim 1, wherein the dispensing outlet protrudes outwards beyond an external face of the housing.

10. The dispenser of claim 9, wherein, when in the closed state, a space formed below the dispensing outlet is configured to accommodate the removable container.

11. The dispenser of claim 10, wherein the container-supporting shelf is configured to be pressed into said second closed position by the removable container when received within said space and comes into contact with the container-supporting shelf.

12. The dispenser of claim 1, being a water dispenser.

13. The dispenser of claim 12, wherein said dispenser comprises one or more water treatment modules for treating source water into treated water.

14. The dispenser of claim 1, wherein said container-supporting shelf is configured to hold beverage spillage or drips from the dispensing outlet.

* * * * *